United States Patent [19]

Pellizzon et al.

[11] 4,142,915
[45] Mar. 6, 1979

[54] PROCESS FOR THE PREPARATION OF YELLOW IRON HYDROXIDE PIGMENT

[75] Inventors: Tullio Pellizzon, Paderno Dugnano, (Milan); Luigi Piccolo; Antonio Paolinelli, both of Milan, all of Italy

[73] Assignee: EUTECO S.p.A., Sassari, Italy

[21] Appl. No.: 847,488

[22] Filed: Nov. 1, 1977

[30] Foreign Application Priority Data

Jan. 11, 1977 [IT] Italy ............................. 19150 A/77

[51] Int. Cl.$^2$ .............................................. C09C 1/24
[52] U.S. Cl. .................................. 106/304; 423/623; 423/633; 260/580
[58] Field of Search ..................... 106/304; 260/580; 423/632, 633

[56] References Cited

U.S. PATENT DOCUMENTS

| 1,793,942 | 2/1931 | Laux | 260/580 |
| 2,273,101 | 2/1942 | Haberland | 106/304 |
| 2,696,426 | 12/1954 | Marcot | 423/633 |
| 3,755,554 | 8/1973 | Larlach et al. | 423/633 |

Primary Examiner—Winston A. Douglas
Assistant Examiner—J. V. Howard
Attorney, Agent, or Firm—J. Harold Nissen

[57] ABSTRACT

This invention describes a process for preparing a yellow iron hydroxide pigment from inorganic ferrous salts and aromatic nitro compounds.

17 Claims, No Drawings

PROCESS FOR THE PREPARATION OF YELLOW IRON HYDROXIDE PIGMENT

This invention relates to the preparation of a yellow iron hydroxide pigment from inorganic ferrous salts by a process which includes the simultaneous reduction, by these ferrous salts, of aromatic organic nitro compounds.

Reduction of reducible nitrogen aromatic compounds by means of metallic iron in an acid environment, with the corresponding production of amine and a precipitate consisting of iron oxides with pigmentary characteristics, is a technique which is known. This process essentially has drawbacks which arise from corrosion of the equipment due to the chemically and physically corrosive nature of the solutions and suspensions involved.

The possibility of producing aromatic amines by reduction with ferrous salts of reducible nitrogenous aromatic compounds is also known. However, this pocess is not performed under conditions which precipitate iron oxides satisfactory pigmentary characteristics. In particular, when evaluating this known process we have not been able to find conditions which make it possible to produce the particular desired pigment in a safe and reproducible manner.

These drawbacks can be overcome by following the procedure of this invention in accordance with which the reduction of the aromatic nitro compounds (also referred to as "nitro-derivatives") by means of ferrous salts can be accomplished with production of yellow iron hydroxide with high pigmentary characteristics.

This invention relates more particularly to the preparation of iron hydroxide pigment FeO(OH), of a yellow colour, of an acicular shape with average dimensions of the needles of an order of $0.12 \times 0.7$ microns, from ferrous sulphate, an inorganic base and an aromatic organic nitro compound, by a procedure which comprises:

(a) bringing into contact, in an initial reaction stage, ferrous sulphate aqueous solution, aqueous ammonia and an aromatic nitro compound, the molar ration between the ammonia and the ferrous sulphate being less than 1:1 and the maximum ratio between the moles of the ammonia and the number of nitrogen groups of the aromatic nitro compound being equivalent to or less than 6:1, with operation at a temperature from 20° C. to 70° C. for a period of at least equal to that required to achieve a constant or substantially constant pH in the reaction medium, such as to form a suspension of iron hydroxide pigment nuclei FeO(OH), with a solid content evaluated as FeO(OH) not exceeding 80 g/l;

(b) mixing, in a second reaction stage, an aqueous solution of ferrous sulphate, an organic nitro derivative and the pigment nuclei of ferrous hydroxide from the initial stage and while operating at a temperature of 20° to 70° C., feeding aqueous ammonia up to a maximum of 2.0 to 2.5 moles per mole of ferrous sulphate, the molar ratio between the ammonia and the organic nitro derivative being equal to or less than approximately 12/1, such ammonia feed furthermore taking place gradually in order to maintain, in the reaction medium, a pH equal to or less than 8.5 such as to form a suspension of iron hydroxide pigment FeO(OH) with a solid content evaluated as FeO(OH) not exceeding 120 g/l, the amount of the initial stage nuclei being from 8 to 20 parts by weight for each 100 parts by weight of the precipitate in the second stage;

(c) recovering the pigmentary iron hydroxide and the aromatic amine from the reaction products obtained in the second stage.

The inorganic salt used for the purposes of this invention is ferrous sulphate. It is possible to use pure ferrous sulphate or a mix which contains ferrous sulphate, such as one originating from the production of titanium dioxide using the sulphate process. As is known, these mixes contain predominant quantities of ferrous sulphate in its heptahydrate form and lesser quantities of other sulphates such as those of magnesium, aluminium, manganese, chrome and titanium.

The nitro compounds used in the process of this invention are aromatic organic compounds which contain one or more nitro groups linked to an aromatic ring. The compound can have one or several aromatic rings, and in the latter instance the rings can be condensed or not. The compound will be a by-product.

Preferably, the nitro compound is liquid under the conditions at which reaction takes place. It will usually be selected from those which can be defined by the following general formulae:

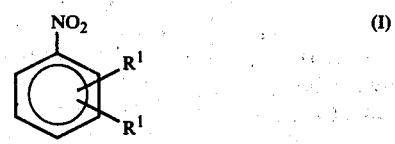

where $R^1$ is the same or different and represents a hydrogen atom, alkyl group, halogen atom, or one of the groups —OH, —OCH$_3$, —NH$_2$, —CHO, —COOH, —SO$_2$OH and —SO$_2$NH$_2$;

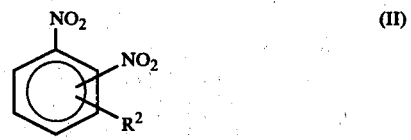

where $R^2$ represents a hydrogen atom or an alkyl group;

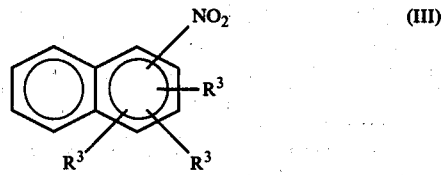

where $R^3$ represents a hydrogen or halogen atom or one of the groups —NO$_2$, —NH$_2$, —OH and —SO$_2$OH;

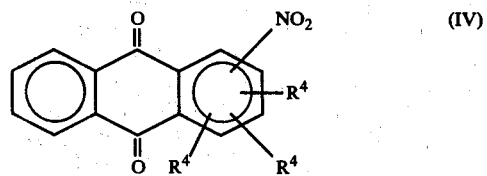

where $R^4$ represents a hydrogen or halogen atom or an —SO$_2$OH group.

Of these, preferred nitro compounds for the process of this invention are: nitrobenzene, p-nitrotoluene, o- nitrotoluene, p-chloronitrobenzene, o-chloronitrobenzene, 2,4-dimethylnitrobenzene, o-nitroanisole, p-nitrobenzoic acid, m-nitrobenzenesulphonic acid, p-nitroaniline or 2,4-dinitrotoluene.

The three principal steps of the process according to the present invention will now each be considered in greater detail.

Stage (a) — Preparation of the nuclei

It has been found that in the stage of preparation of the nuclei the formation of iron hydroxide nuclei FeO(OH) occurs favourably in an environment in which the iron is precipitated only partially in relation to the iron present in the solution. It is not normally convenient to operate with precipitation of less than approximately 10% of the iron, particularly in view of economic reasons because of the large masses which then have to be treated to produce the same quantity of nuclei.

The molar ratio between the ammonia and the ferrous sulphate is less than 1:1 and generally 0.2:1 to 1:1. The best results are realized with molar ratios between the ammonia and the ferrous sulphate of 0.4:1 to 0.6:1.

The preparation of the nuclei involves the partecipation of an aromatic nitroderivate, preferably one selected from those already specifically referred to. The molar ratio between the ammonia and one equivalent of the aromatic nitroderivative (it will be understood throughout this specification that the nitro compound can have more than one reactive nitro group and due allowance must be made when calculating molar ratios) is equal to or less than approximately 6:1. The quantity of aromatic nitroderivative is thus usually almost equal to the stoichiometric value required for the oxidation of the precipitated iron. However, it is obviously possible to use larger quantities in relation to the stoichiometric value in order to complete the reaction. In such case, the unconverted aromatic nitroderivative passes, together with the suspension of the nuclei, to the subsequent stage of preparation of the pigment.

The ferrous sulphate not converted during the nuclei preparation stage is utilized in the same way.

The degree of dilution of the medium used in stage (a) is of importance and, in practice, the conditions are regulated in such a way that the solids contents, evaluated as FeO(OH), in the suspension produced does not exceed 80 g/l. The lower limit for the solids content is not critical but it is not generally advisable to allow it to fall below 10 g/l for reasons of economy. The best results are realized when the solids content in the suspension is of the order of 30 g/l.

When preparing the nuclei, a temperature gradually from 20° C. to 70° C., with preferred values from 35° C. to 65° C. is used.

It is found that the pH of the medium is always less than 6 and generally within a range of from 3.0 to 5.8.

A change in the pH of the medium, with a gradual decrease during the course of the reaction from a maximum value (typically of the order of 5.5 to 5.8) to a minimum value (typically of the order or 3.0 to 3.5), is typical.

The time required to reach the minimum, substantially constant value of the pH is a function of the temperature preselected for the reaction and generally varies from 2 to 10 hours.

The reactions which lead to the formation of the nuclei are believed to be the following:

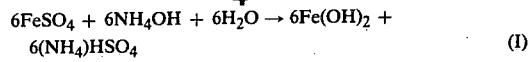

$$6FeSO_4 + 6NH_4OH + 6H_2O \rightarrow 6Fe(OH)_2 + 6(NH_4)HSO_4 \qquad (I)$$

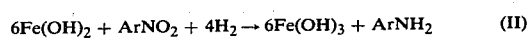

$$6Fe(OH)_2 + ArNO_2 + 4H_2 \rightarrow 6Fe(OH)_3 + ArNH_2 \qquad (II)$$

$$6Fe(OH)_3 \rightarrow 6FeO(OH) + 6H_2O \qquad (III)$$

where Ar represents the aryl moiety of the aromatic nitro compound.

Reaction I is practically instantaneous whilst reactions II and III require a relatively long time, so that their progress may be followed easily by measurements of the pH of the medium.

The overall reaction is in any event as follows:

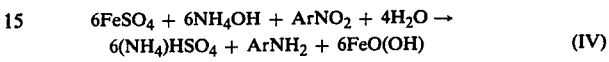

$$6FeSO_4 + 6NH_4OH + ArNO_2 + 4H_2O \rightarrow 6(NH_4)HSO_4 + ArNH_2 + 6FeO(OH) \qquad (IV)$$

On completion of this reaction, the value of the pH of the medium is constant or substantially constant and there is no further production of the precipitated nuclei.

These nuclei prove to consist, on chemical analysis, of FeO(OH) and, on microscopic examination, of extremely fine needles of a thickness of approximately 1/10 completed with the thickness of the pigmentary particles which will be prepared.

These extremely fine needles constitute the nuclei on which the pigment particles develop.

Stage (b) Preparation of the pigment

In accordance with the process of this invention, a mix consisting of ferrous sulphate in aqueous solution, an aromatic nitro-derivate and nuclei obtained in the first stage, is prepared.

The nitro-derivate is preferably selected from those described above and can be the same as or different from the one used in the nuclei preparation stage.

The nuclei themselves may be used but preferably use is made of the suspension since in this way there is recovery of the ferrous sulphate and any nitroderivate which have not undergone conversion in the first stage of the process.

To this mix, maintained at a temperature from 20° C. to 70° C. and with effective stirring, aqueous ammonia is added slowly and gradually in order to maintain the pH a value as constant as possible, the value being selected from the range of from 3.5 to 8.5. The best results are obtained by operating at a pH from 4 to 7.5 and at a temperature of 35° to 65° C.

In practice, the feed of the ammonia takes place at a speed commensurate with that of the formation of the pigment, according to the equations mentioned above, so that the concentrations of ammonia and ferrous hydroxide are maintained at each instant at negligibly low values.

The maximum quantity of ammonia which is allowed is equal to or slightly greater than the ammonia required for the precipitation of the iron and therefore the maximum value of the ammonia:ferrous sulphate molar ratio is of the order of 2:1 to 2.5:1. Once that limit has been reached, the pH of the medium tends to increase in an undesirable manner. The minimum value for the ratio in question is of the order of 0.5:1. It is not convenient to go below that value both in view of the poor economy in the use of ferrous sulphate and also because the precipitate which is formed is not sufficient for growth of the nuclei up to the size required for the pigment. Optimum results are obtained with ammonia:ferrous sulphate molar ratios of 0.9:1 to 2.2:1.

The quantity of nitro derivate present in the reaction mix must be at least equal to the stoichiometric value for reaction II mentioned above. The maximum molar ratio between the ammonia and one equivalent of the nitro-derivate in this case is thus equal to approximately 6:1. In this way, the formation of ammonium bisulphate is brought about as appears from the equation mentioned above.

It is however possible to add more ammonia until neutral ammonium sulphate is formed, without in any way affecting the pigment formation reaction. In these circumstances, the maximum value of the molar ratio between the ammonia and one equivalent of the nitro-derivate reaches values of the order of approximately 12:1.

It is also possible to operate with an excess of aromatic nitro-derivative as compared with the stoichiometric value, although this then gives rise to a problem of separation from the other reaction products.

In practice, aqueous ammonia is added to the reaction medium, maintaining the pH at the most constant value possible. The reaction terminates when the pH tends to increase beyond these levels.

Even in the stage of preparation of the pigment, the degree of dilution of the medium used is important. In practice the conditions are regulated in such a way that the pigment suspension produced possesses a solid content, evaluated as FeO(OH), not in excess of 120 g/l, and more conveniently 45 to 65 g/l.

Another important factor for the correct growth of the nuclei to the proper pigment dimensions is concentration of nuclei in relation to the quantity of pigment produced. More particularly the conditions are regulated in such a way that the quantity of nuclei from the first stage is from 8 to 20 parts and preferably from 10 to 15 parts by weight for each 100 parts by weight of the pigment produced in the second stage.

Stage (c) — Separation of the reaction products

The products of the reaction obtained in the preceding stage are a suspension of pigments in a liquid mix containing aromatic amine corresponding to the nitro-derivate used, any excess nitro-derivate, and an aqueous solution containing the dissolved ammonium sulphate and any unreacted ferrous sulphate.

The separation of this mix into the individual components can be realized using normal techniques. For example, it is possible to separate the organic components by means of steam stripping. The residual suspension is filtered to separate the pigment and the latter is subjected to scrubbing, using water (preferably acidulated water) and finally dried.

The residual solution may be treated for the purpose of recovering the inorganic salts contained in it.

As will be evident from the following experimental examples, a pigment can be obtained in this way which consists of ferrous hydroxide FeO(OH) of a yellow colour, of an acicular shape, with average needle dimensions of the order of 0.12 × 0.7 microns and a restricted distribution about these dimensions. Such pigment have high tinting strength values when this characteristic is evaluated in accordance with ASTM D 38760.

Embodiments of the process of the present invention will now be described in detail by way of example.

EXAMPLE 1

Formation of the nuclei

Ferrous sulphate heptahydrate, obtained as a by-product in the production of titanium dioxide using the sulphate process and having the following composition expressed in percentage by weight, is used: $FeSO_4.7H_2O$ 88.5%; $MgSO_4.7H_2O$ 6.3%; $Al_2(SO_4)_3$ $18H_2O$ 0.3%; $TiOSO_4$ 0.1%; $MnSO_4.5H_2O$ 0.3%; $H_2SO_4$ free 0.5% $CaSO_4.2H_2O$ 0.2%; $H_2O$ free 3.5%. Traces of $VOSO_4$ (50 ppm) and $Cr_2(SO_4)_3$ (2 ppm) are also present.

314 grammes of ferrous heptahydrate sulphate (containing one mole of ferrous sulphate) are dissolved in water to a concentration of ferrous sulphate equivalent to 0.68 moles/liter.

0.55 moles of ammonia in the form of an aqueous solution with a concentration of 1.83 moles/liter are added over a period of three minutes to the solution which is continuously stirred at 25° C. This addition results in the formation of ferrous hydroxide which precipitates in gelatinous form.

0.17 moles (21 grammes) of nitrobenzene are added over 3 minutes to the suspension obtained in this way, and the resulting mix is continuously stirred at 25° C.

Immediately after the addition of the nitrobenzene, the pH is 5.6 and gradually falls over the course of time whilst the precipitate lose its colloidal characteristics and assumes a yellow shade of colour.

After approximately 6 hours, the pH reaches the constant value of 3.5 and no further conversion of the particles of the precipitate takes place.

The suspension contains a quantity of solids, evaluated as FeO(OH), equivalent to 27 g/l.

On chemical analysis, these solids prove to consist of FeO(OH) and, on microscopic analysis, of extremely fine needles of a thickness of approximately 1/10 the thickness of the pigment particles.

Formation of the pigment 1256 grammes of the ferrous heptahydrate sulphate described above (containing 4 moles of ferrous sulphate) are dissolved in 4 liters of water at 25° C.

0.67 moles (82.5 grammes) of nitrobenzene are added to the aqueous solution at the same temperature.

The suspension of nuclei, the preparation of which has been described in the first part of the Example, is added to the mix obtained in this way, and the resultant mixture is heated to 60° C.

When this temperature is reached, 4.45 moles of ammonia in the form of an aqueous solution with a concentration of 1.85 moles/l is gradually added.

The addition of the ammonia solution takes place over approximately 19 hours and, during this period, the pH value is maintained constantly at 4.1 to 4.2.

The nuclei from the first stage form 12% by weight of the pigment precipitate in the form of FeO(OH).

At the end of the addition of the ammonia aqueous solution, the suspension contains 54 g/l of solids, expressed as FeO(OH), and is subjected to distillation with a steam current in order to separate the aniline produced.

The residue is filtered to separate the pigments. After stirring whilst washing using water (acidulated with sulphuric acid up to 2% in weight) the pigment is dried.

The pigment, of yellow colour, is homogeneous acicular crystals of FeO(OH) with average dimensions of 0.12 × 0.7 microns and tinting strength characteristics (ASTM D 38760) of 112, compared with 100 for the commercial product SIOF C.1015.

clei formation stage is 12% compared with the total precipitate.

Table 1

| Example or Comparative Example | FeSO$_4$ | | Nitrobenzene | Ammonia | | pH | | Temperature (°C.) |
|---|---|---|---|---|---|---|---|---|
| | (moles) | (moles/l) | (moles) | (moles) | (moles/l) | (initial) | (final) | |
| 2 | 1 | 0.68 | 0.17 | 0.55 | 1.83 | 5.6 | 3.5 | 40 |
| 3 | 1 | 0.68 | 0.17 | 0.55 | 1.83 | 5.6 | 3.5 | 60 |
| A | 1 | 0.68 | 0.17 | 0.55 | 1.83 | 5.6 | 3.5 | 60 |
| B | 1 | 0.68 | 0.17 | 2.0 | 1.83 | 6.9 | 6.9 | 60 |
| 4 | 1 | 0.68 | 0.17 | 0.55 | 1.83 | 5.6 | 3.5 | 40 |
| C | 2 | 0.68 | 0.34 | 1.1 | 1.83 | 5.6 | 3.5 | 40 |
| D | 0.5 | 0.68 | 0.085 | 0.275 | 1.83 | 5.6 | 3.5 | 40 |

Table 2

| Example or Comparative Example | Ferrous Sulphate | | Nitrobenzene | Ammonia | | pH | Temperature (°C.) |
|---|---|---|---|---|---|---|---|
| | (moles) | (moles/l) | (moles) | (moles) | (moles/l) | | |
| 2 | 4 | 1 | 0.67 | 4.45 | 1.83 | 4.1–4.2 | 60 |
| 3 | 4 | 1 | 0.67 | 4.45 | 1.83 | 4.1–4.2 | 60 |
| A | 4 | 1 | 0.67 | 4.45 | 1.83 | 4.1–4.2 | 80 |
| B | — | — | — | — | — | — | — |
| 4 | 4 | 1 | 0.67 | 10 | 1.83 | 7.3 | 60 |
| C | 4 | 1 | 0.66 | 4.9 | 1.83 | 4.1–4.2 | 60 |
| D | 4 | 1 | 0.67 | 4.2 | 1.83 | 4.1–4.2 | 60 |

EXAMPLES 2 TO 4

The formation of the nuclei is similar to that in Example 1, the precise operating parameters being shown in Table 1. In particular, the Table shows the values:

of the quantity (moles) and concentration (moles/liter) of the ferrous sulphate (the latter is as in example 1);

of the quantity (moles) and concentration (moles/liter) of the aqueous ammonia added to the aqueous solution of the ferrous sulphate;

of the quantity (moles) of nitrobenzene added to the suspension of ferrous hydroxide;

the value of the pH immeditaly after the addition of the nitrobenzene and the final value;

the temperature at which the operations take place.

The suspension of the nuclei obtained in Examples 2, 3 and 4 is used in the formation of the pigment, and Table 2 indicates the conditions in which the operation takes place.

In particular, the Table shows:

the quantity (moles) and the concentration (moles/liter) of the ferrous sulphate;

the quantity (moles) of nitrobenzene;

the quantity (moles) and the concentration (moles/liter) of ammonia;

the value of the pH;

the temperature at which the operation takes place.

The tables also include data for Comparative Examples A to D. Examples A is a comparison in that it is conducted outside the temperature range suitable for the formation of the pigment. Example B is a comparison in that the excess ammonia is used. The ferrous hydroxide precipitate maintains its gelatinous nature and therefore cannot be used in the formation of the pigment.

Examples C and D are comparative in that the nuclei contributes to the final precipitate in an amount outside the limits described above, more specifically amounts of 22.5% and 6.4% respectively.

In Examples 2 to 4 and in Comparative Example A, the amount of the precipitate originating from the nu- The pigments obtained in the Examples are yellow acicular crystals similar to those from Example 1, with tinting strengths of 115, 113 and 118 respectively, when evaluated in a manner as in Example 1.

For reasons explained above, no crystals are obtained in Comparative Example B. In Comparative Example A, orange crystals are obtained with a heterogeneous mixture of shapes (partially acicular and partially spherical).

In Comparative Example C and D, yellow acicular crystals are again obtained, although of a rather irregular shape and with tinting strengths of 103 and 98 respectively.

What we claim is:

1. A process for the preparation of ferrous hydroxide pigment FeO(OH), of a yellow color in acicular shape with average dimensions of the needles of the order of 0.12 × 0.7 microns, from ferrous sulphate, an inorganic base and an aromatic organic nitroderivate, including:
    (a) a first stage comprising forming a suspension of nuclei of the ferrous hydroxide pigment FeO(OH) by reacting ferrous sulfate in aqueous solution, aqueous ammonia and an aromatic nitro-derivate in a molar ratio of ammonia to ferrous sulfate of less than about 1:1 and a molar ratio of ammonia to nitro groups of the aromatic nitro-derivatives of about equal to or less than 6:1, at temperatures in the range of from about 20° C. to about 70° C., until the pH of the mixture becomes substantially constant, to form a suspension of ferrous hydroxide pigment containing solids — evaluated as FeO(OH) — of less than 80 grams per liter; thereafter
    (b) a second stage comprising mixing the nuclei with an aqueous solution of ferrous sulfate and an organic nitro derivate at a temperature of about 20° C. to about 70° C. and adding aqueous ammonia to the mixture, slowly in order to avoid raising the pH of the mixture above about 8.5, and in amounts up to a maximum molar ratio of ammonia to the organic nitroderivate of between about 6:1 to 12:1 to form a suspension of ferrous hydroxide pigment with a solid content not exceeding about 120 grams per liter, the amount of nuclei utilized being from about 8 to 20 parts by weight for each 100 parts by weight of pigment, and (c) recovering the pigmentary ferrous hydroxide and the amine formed by the reaction.

2. A process as claimed in claim 1 in which the ferrous sulphate comprises heptahydrate ferrous sulphate obtained as a by-product in the preparation of titanium using the sulphate process.

3. A process as claimed in claim 1 in which the aromatic nitro-derivate contains one or more nitro groups bonded to an aromatic compound having one ring or several condensed or uncondensed rings.

4. A process as claimed in claim 1 in which the first stage takes place with a molar ratio between the ammonia and the ferrous sulphate of 0.2:1 to 1:1.

5. A process as claimed in claim 4 wherein the molar ratio between the ammonia and the ferrous sulphate is from 0.4:1 to 0.6:1.

6. A process as claimed in claim 1 in which in the first stage the temperature is from 35° to 65° C.

7. A process as claimed in claim 1 in which the first stage is carried out at a pH of 3.0 to 5.8.

8. A process as claimed in claim 1 in which the suspension of nuclei produced in the first stage has a solids content, evaluated as FeO(OH), from 10 to 80 gr/liter.

9. A process as claimed in claim 1 in which the solids in the first stage is of the order of 30 gr/lt.

10. A process as claimed in claim 1 in which the second stage is carried out with a molar ratio between the ammonia and ferrous sulphate of 0.5:1 up to 2.5:1.

11. A process as claimed in claim 10 in which the molar ratio in the second stage between the ammonia and ferrous sulphate is from 0.9:1 to 2.2:1.

12. A process as claimed in claim 1 in which the second stage takes place at a pH of 3.5 to 8.5.

13. A process as claimed in claim 12 in which the second stage takes place at a pH of 4 to 7.5.

14. A process as claimed in claim 1 in which in the second stage the temperature is from 35° to 65° C.

15. A process as claimed in claim 1 claims in which, in the second stage, a suspension of pigment having a solids content — evaluated as FeO(OH) — of from 45 to 65 g/l is obtained.

16. A process as claimed in claim 1 in which the quantity of the pigment nuclei from the first stage is from 10 to 15 parts by weight for each 100 parts by weight of the pigment produced in the second stage.

17. A process as claimed in claim 1, in which: in the first stage
(a) the molar ratio of ammonia to ferrous sulphate is between 0.2:1 to 1:1;
(b) the temperature is in the range of 35° C. to 65° C.; and
(c) the pH is maintained in a range of about 3.0 to about 5.8; and
in the second stage
(a) the molar ratio of ammonia to ferrous sulfate is from 0.9:1 to 2.2:1;
(b) the pH is maintained in the range of about 3.5 to about 8.5; and
(c) the temperature is in the range of 35° C. to 65° C.

* * * * *